United States Patent [19]

Laube et al.

[11] 4,362,329

[45] Dec. 7, 1982

[54] MOBILE SERVICE VEHICLE

[75] Inventors: Dennis Laube, Wapakoneta; Michael Bell, Gahanna; Daniel E. Hausch, Findlay, all of Ohio

[73] Assignee: Countdown, Columbus, Ohio

[21] Appl. No.: 148,296

[22] Filed: Sep. 4, 1980

[51] Int. Cl.³ .............................................. B60P 3/34
[52] U.S. Cl. ...................................... 296/26; 296/165
[58] Field of Search ................. 296/26, 165, 172, 176, 296/169, 27

[56] References Cited

U.S. PATENT DOCUMENTS

| | | | |
|---|---|---|---|
| 1,305,162 | 5/1919 | Puff | 296/26 |
| 2,188,545 | 1/1940 | Smelker | 296/26 |
| 2,976,078 | 3/1961 | Maidl | 296/26 |
| 3,697,123 | 10/1972 | Gygrynuk | 296/24 R |
| 3,705,743 | 12/1972 | Toomey | 296/24 R |
| 4,222,604 | 9/1980 | Human | 296/165 |

Primary Examiner—Robert R. Song
Attorney, Agent, or Firm—Anthony D. Cennamo

[57] ABSTRACT

A mobile vehicle service station including an enclosed service vehicle to provide an indoor-like working area similar to a bay for servicing other vehicles. The extendable bay comprises the rear doors opening into two side walls and top member outwardly extending from a closed position at the rear of the service vehicle to engaging the upper portion of the open doors. The one end of the bay at the rear portion of the vehicle includes means for lowering its floor to ground level; whereas the end opposite thereof, enclosed on three sides as aforesaid, is open to permit the entry of the vehicle to be worked upon. The service station vehicle includes the necessary apparatus, test instruments, tools, power source, spare parts, and the like for the intended service or repairs.

5 Claims, 2 Drawing Figures

MOBILE SERVICE VEHICLE

BACKGROUND

It is well known in the prior art to include in a truck repair station apparatus for the repair of other vehicles. Such mobile repair stations were used extensively during World War I and II as being part of the vehicle caravan.

There is also known in the prior art vehicles whose interiors have been modified to include apparatus to provide mobile service. The services and the intended apparatus included for the service vehicle varies from car repair, to poodle grooming, to carpet cleaning.

Trucks and similar vehicles have been modified to have appendages, such as tool boxes, trucks, and tire wells extend from the vehicle from a recessed position.

In U.S. Pat. No. 3,697,123 there is disclosed a van type of truck having included therein an assortment of auto repair apparatus. In the vehicles there is also an extendable roof structure with curtain-like side drops. Although the concept of providing a mobile vehicle repair station is suggested in this prior art patent, it's completeness for it's intended purpose is crude at best. Specifically, this prior patent does not provide an "indoor" condition repair station. The drop curtain of the prior art patent will be a partial wind break, but will not provide a complete enclosure from all of the elements to simulate an indoor bay for servicing a vehicle. For instance, means for heating the extended area is not suggested in the prior patent and would be most useless if attempted.

The modified vehicles that provide service structure extendable from a recessed position, do not suggest in any manner the creation of a service bay for servicing other vehicles.

The trucks, vans, and other vehicles modified interiorly to provide specialized services do not suggest a repair station or bay extendable therefrom the workpiece vehicle.

SUMMARY OF THE INVENTION

The present invention has as it's intended purpose providing a mobile service station or bay for servicing other vehicles. The mobile service vehicle is modified interiorly to provide apparatus necessary for the intended repairs or service to the automobile. Additionally the mobile vehicle includes a power source for the operation of the power tools, lights, etc. Also, included is a heat source for heating the interior of the body of the mobile service vehicle and for heating the service bay when an attendant is servicing another vehicle.

To recreate an interior service station or bay the two rear horizontally swinging doors are opened to form the two side walls thereof. With the doors open, a hinged flat-like structure is lifted to extend over the area and engage the upper portion of the two open walls. The rear portion of the floor of the service vehicle includes power means to lower the same to ground level, and thereby complete the bay area for servicing other vehicles.

In addition to the power source providing power for tools, test instruments and the such, the power source also provides electricity for the power lifts for the floor.

OBJECTS

Accordingly, it is a principal object of the present invention to provide with a mobile service station an enclosure that simulates an indoor service bay for servicing automobiles.

Another object of the present invention is to provide a mobile service station with a service bay that is insulated from the elements, lighted, heated, and floored from the ground.

Other objects and features of the present invention will become apparent from the following detailed description when taken in conjunction with the drawings in which:

DETAILED DESCRIPTION OF DRAWINGS

Figure 1:
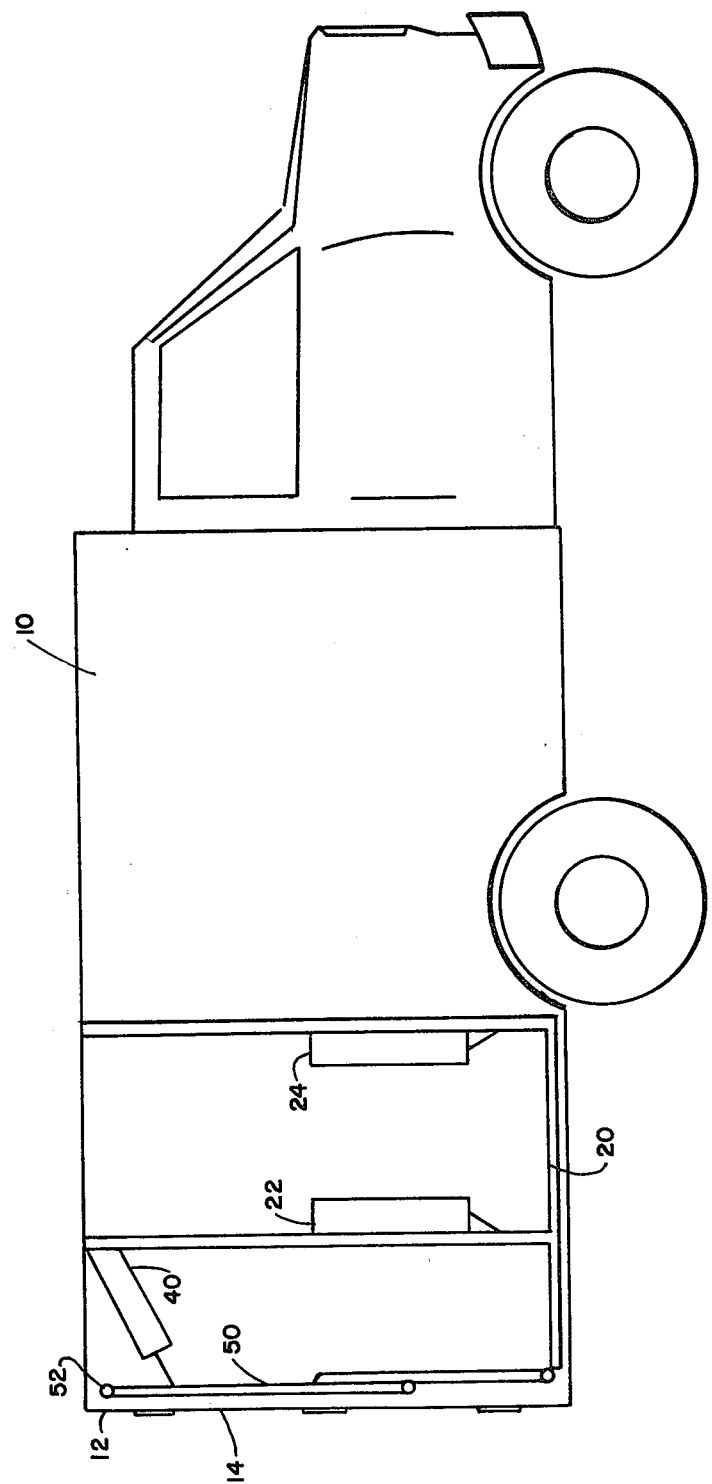
FIG. 1 is a side view of the preferred embodiment of the invention illustrating the service bay in it's closed and mobile position.
Figure 2:
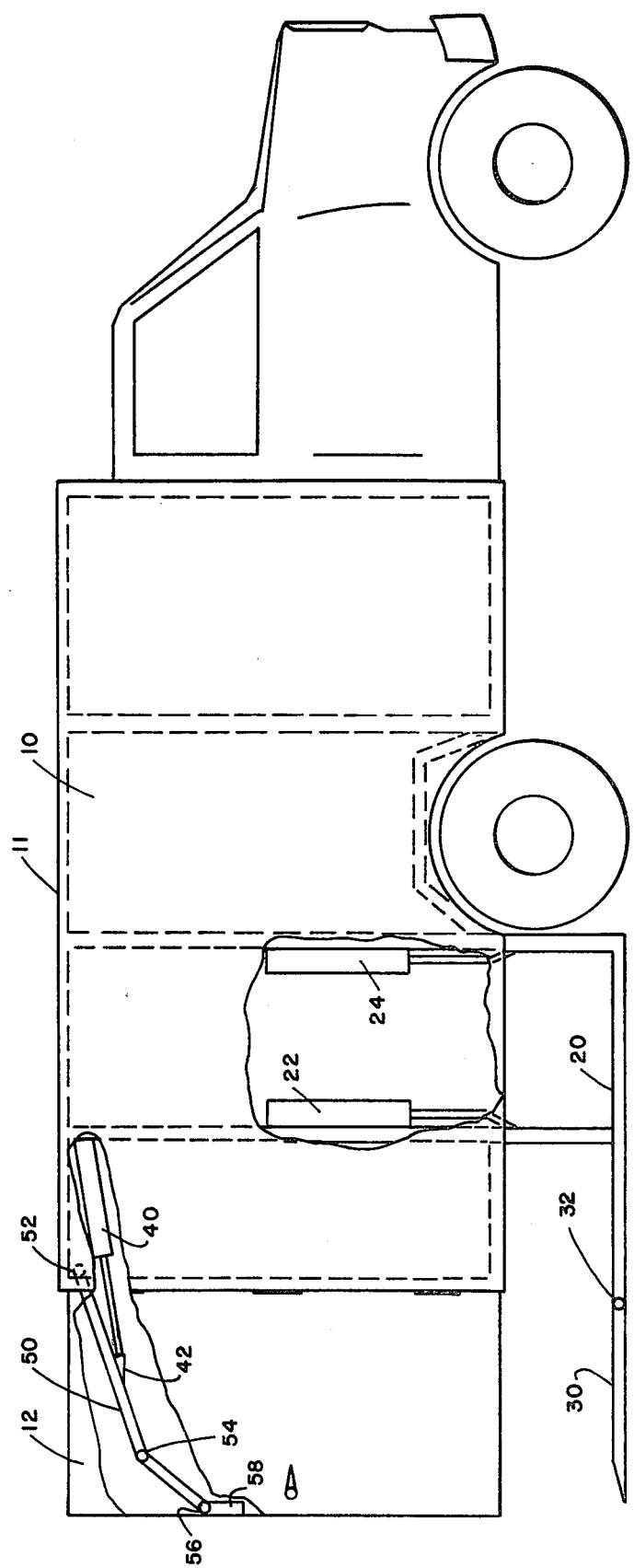
FIG. 2 is a similar view to that of FIG. 1 except that the service bay is in it's extended position from the mobile vehicle and ready for it's operational use.

With particular reference to the drawings, FIGS. 1 and 2 illustrate the service vehicle modified in accordance with a preferred embodiment of the invention to provide a service bay for servicing other vehicles. FIG. 1 illustrates the modification in this recessed or closed position; whereas FIG. 2 illustrates the modification in its open position to provide a service bay.

In FIG. 1 the vehicle 10 is a standard commercial vehicle. It has a box-like truck area. To the rear of the truck are two doors 12 and 14 hingedbly openable outwardly. Principally the modification comprises the roof structure 50 hinges at hinge 52 to set vertically at the rear of the vehicle adjacent and inside the closed doors. Vertically in line with structure 50 is an extended floor structure upraised to also set vertically at the rear of the vehicle adjacent and inside the closed door.

In the recessed or closed position the outside vehicle appears unmodified.

In the open or operational position the modification and added structure is extended as shown in FIG. 2. Initially, the two rear doors 12 and 14 are swung open. In FIG. 2 the nearest door 14 is removed in order to illustrate the inside positioning and locking of the roof structure 50. The configuration of the inside of door 14 is a mirror image of that of the inside of door 12.

The roof structure 50 is lifted via hinges 52 and 54 to extend horizontally over the service area. The overall length of structure 50 is somewhat longer than the width of the open door 12. In this way, although the structure 50 forms a roof structure, it also provides an environmental protective area for the upper $\frac{1}{3}$-$\frac{1}{2}$ of the rear of the open truck. To maintain the structure 50 in perhaps a 30°-45° angle its foremost end 56 engages and locks with the interlock 58 positioned on the inside of the door 12.

Returning to the roof structure 50, there is provided in a preferred embodiment power means 40 to mechanically and easily open the structure 50. The end of the piston arm 42 rides within a groove positioned in the edges of the structure 50.

Next the floor 20 is lowered via power jacks 22 and 24, 26 and 28 from its normal position to that of resting on the ground surface. In the preferred embodiment power means 22/24 are in pairs for each side of the vehicle. Power to these power jacks is provided by the apparatus within the service vehicle.

With the floor 20 lowered to the ground level the extendable floor structure 30 is lowered via hinge 32 to horizontally rest on the ground surface also.

It can now be seen that the created surface area has two sides, partly the open rear door and the other part the inside of the service truck. The roof structure 50 extends from the roof 11 of the truck 10 to provide a roof for that portion of the open doors and also to provide environmental protection to the open end of the service truck.

The portion below the lowermost end of the roof surface 50 is sufficiently high to permit the entry of the front portion of a vehicle to be serviced. Once inside, the hood of the vehicle is opened and its natural open position will be adjacent to the inside of the roof structure 50.

Also in operation, the vehicle being serviced will rest over the extended floor 30, thereby providing a continuous floor at ground level for the operator to stand on.

We claim:

1. A mobile repair/service vehicle, having a pair of horizontally swinging doors at its rear opening, modified to provide a service bay, comprising:
   a roof structure hingedly connected along the upper portion of the rear opening of the vehicle, said roof structure raisable to extend rearwardly and outwardly of the rear opening over said service bay from a lowered upright position extending vertically at the rear of the inside of the vehicle, and means for maintaining said roof structure in its raised position in cooperation with the rear doors when open;
   the rearmost portion of the floor of said vehicle having means for lowering said floor portion from its normal height to ground level,
   said portion of floor further including an extendable portion hingedly connected thereto to extend from a closed upright position to an open position resting on the ground.

2. The service vehicle of claim 1 wherein said roof structure further includes means for locking the same into position with said rear doors when open.

3. The service vehicle of claim 2 wherein said roof structure further includes a second hinge and wherein said locking means is at a position substantially lower than the top of said two doors.

4. The service vehicle of claim 1 wherein said means for lowering said floor is a power means.

5. The service vehicle of claim 1 further comprising power means for opening said roof structure to extend over said bay area.

* * * * *